(12) United States Patent
Carver et al.

(10) Patent No.: US 10,681,062 B2
(45) Date of Patent: *Jun. 9, 2020

(54) INCIDENT TRIAGE SCORING ENGINE

(71) Applicant: Accenture Global Solutions Limited, Dublin (IE)

(72) Inventors: Matthew Carver, Washington, DC (US); Mohamed H. El-Sharkawi, Lansdowne, VA (US); Elvis Hovor, Clarksburg, MD (US)

(73) Assignee: Accenture Global Solutions Limited, Dublin (IE)

( * ) Notice: Subject to any disclaimer, the term of this patent is extended or adjusted under 35 U.S.C. 154(b) by 181 days.

This patent is subject to a terminal disclaimer.

(21) Appl. No.: 15/799,587

(22) Filed: Oct. 31, 2017

(65) Prior Publication Data
US 2018/0124098 A1 May 3, 2018

Related U.S. Application Data

(60) Provisional application No. 62/416,485, filed on Nov. 2, 2016.

(51) Int. Cl.
*H04L 29/06* (2006.01)
*G06N 20/00* (2019.01)
(Continued)

(52) U.S. Cl.
CPC .......... *H04L 63/1416* (2013.01); *G06F 21/50* (2013.01); *G06N 5/025* (2013.01);
(Continued)

(58) Field of Classification Search
CPC ............... H04L 63/1416; H04L 63/145; H04L 63/1425; H04L 63/1441; H04L 2463/146; G06F 21/50; G06N 5/025; G06N 20/00
See application file for complete search history.

(56) References Cited

U.S. PATENT DOCUMENTS 8,494,985 B1 * 7/2013 Keralapura ......... H04L 63/0245
706/12
9,338,181 B1 5/2016 Burns et al.
(Continued)

FOREIGN PATENT DOCUMENTS

EP 2955895 12/2015

OTHER PUBLICATIONS

Australian Office Action for Application No. 2017254913, dated Oct. 19, 2018, 8 pages.
(Continued)

*Primary Examiner* — Mohammad A Siddiqi
(74) *Attorney, Agent, or Firm* — Fish & Richardson P.C.

(57) ABSTRACT

Methods, systems, and apparatus, including computer programs encoded on a computer storage medium, for incident response are disclosed. In one aspect, a system includes a cognitive engine that is configured to receive data identifying actions performed in response to a computer security threat. Based on the data identifying the actions performed in response to the computer security threat, the system generates one or more workflows and a particular workflow that are associated with the computer security threat and that each identify one or more actions to remediate the computer security threat. The system also includes a scoring system and event triage engine that is configured to analyze the actions of the one or more workflows and of the particular workflow, and based on analyzing the actions of the one or more workflows and of the particular workflow, select a primary workflow as a workflow to respond to the computer security threat. The system also includes an automated incident investigation engine that is configured to receive an alert that identifies the computer security threat, and process the computer security threat according to the primary workflow that is associated with the computer security threat and
(Continued)

that identifies one or more actions to remediate the computer security threat.

20 Claims, 12 Drawing Sheets

(51) Int. Cl.
  *G06N 5/02* (2006.01)
  *G06F 21/50* (2013.01)
(52) U.S. Cl.
  CPC .......... *G06N 20/00* (2019.01); *H04L 63/145* (2013.01); *H04L 63/1425* (2013.01); *H04L 63/1433* (2013.01); *H04L 63/1441* (2013.01); *H04L 2463/146* (2013.01)

(56) References Cited

U.S. PATENT DOCUMENTS

| | | | | |
|---|---|---|---|---|
| 9,721,296 | B1* | 8/2017 | Chrapko | G06Q 10/0635 |
| 9,749,336 | B1* | 8/2017 | Zhang | H04L 63/14 |
| 2007/0121596 | A1* | 5/2007 | Kurapati | H04L 29/06027 370/356 |
| 2011/0225650 | A1 | 9/2011 | Margolies et al. | |
| 2014/0283049 | A1 | 9/2014 | Shnowske et al. | |
| 2015/0365438 | A1* | 12/2015 | Carver | H04L 63/1441 726/1 |
| 2016/0164891 | A1 | 6/2016 | Satish et al. | |
| 2016/0269434 | A1 | 9/2016 | DiValentin et al. | |
| 2016/0330226 | A1* | 11/2016 | Chen | H04L 63/1416 |
| 2017/0250875 | A1* | 8/2017 | Jensen | H04L 41/16 |
| 2018/0124077 | A1* | 5/2018 | Carver | H04L 63/1416 |
| 2019/0260653 | A1* | 8/2019 | Yadav | G06F 3/0482 |

OTHER PUBLICATIONS

Australian Office Action for Application No. 2017254913, dated May 11, 2018, 6 pages.
Australian Office Action for Application No. 2017254913, dated Feb. 13, 2019, 5 pages.
European Search Report for Application No. 17199555 dated Feb. 7, 2018, 8 pages.

* cited by examiner

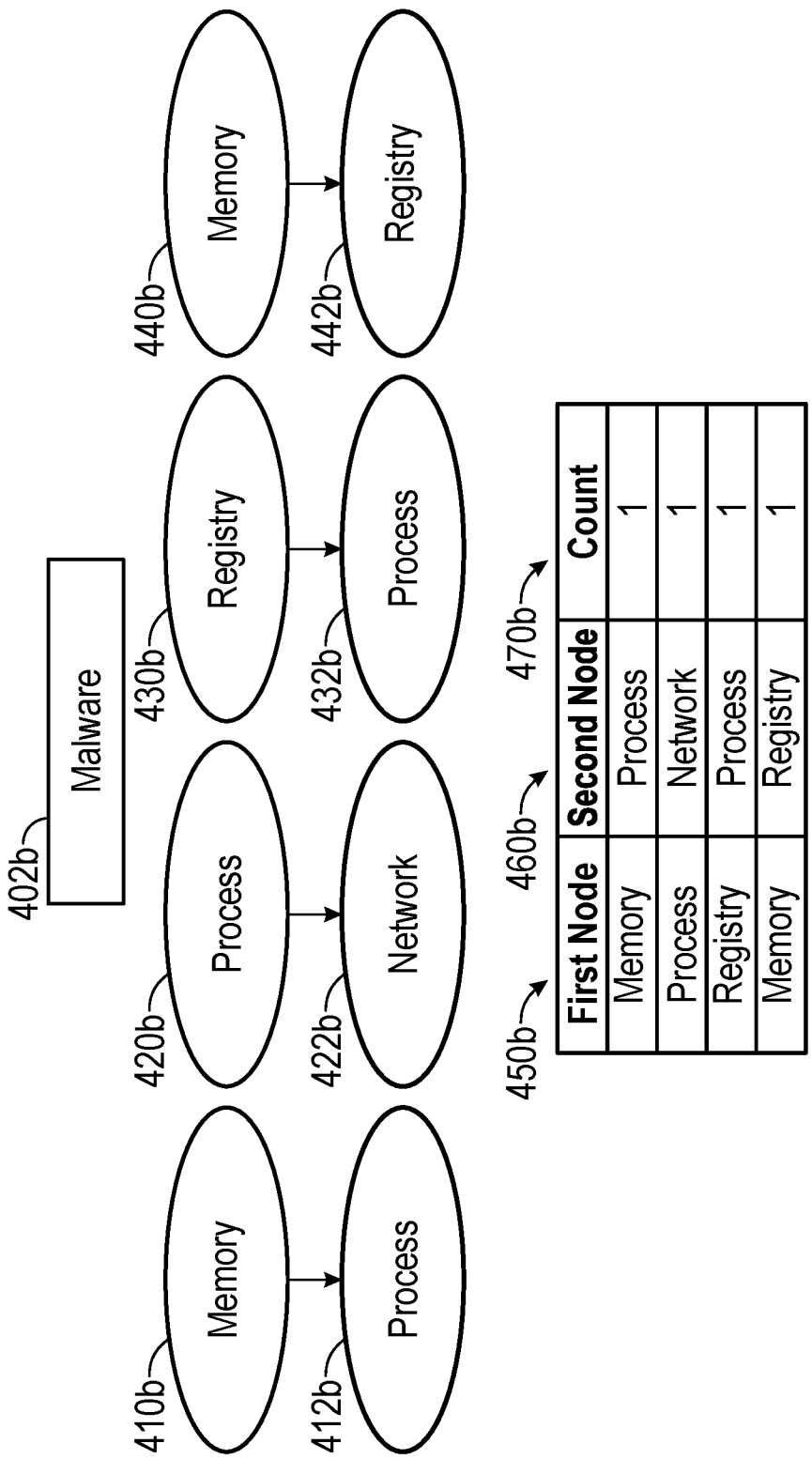

INCIDENT TRIAGE SCORING ENGINE

CROSS-REFERENCE TO RELATED APPLICATION

This application claims benefit of U.S. Provisional Patent Application No. 62/416,485, filed Nov. 2, 2016, and titled "INCIDENT TRIAGE SCORING ENGINE," which is hereby incorporated by reference in its entirety.

TECHNICAL FIELD

This application relates to network security.

BACKGROUND

As enterprise IT infrastructures become more virtualized, cloud-based, and fast changing, traditional cyber security systems cannot adapt well to this trend since these systems are tied to static network identities and rely on stateful devices. One example is an IP based stateful firewall in a cloud. It will not perform as expected if any protected virtual machine has changed its IP address due to cloud operations.

The traditional approach to performing security configuration largely relies on manual work. In addition, since many security controls use assets' physical attributes in their configurations, when the assets' physical attribute changes, it often requires significant manual work to identify other assets and controls that are impacted by that change and to modify relevant configurations. When a new device is added to the network or an existing device is removed, it also may require significant manual changes to security control configurations.

SUMMARY

According to an innovative aspect of the subject matter described in this application, a system includes a cognitive engine that is configured to receive data identifying actions performed in response to a computer security threat. Based on the data identifying the actions performed in response to the computer security threat, the system generates one or more workflows and a particular workflow that are associated with the computer security threat and that each identify one or more actions to remediate the computer security threat. The system also includes a scoring system and event triage engine that is configured to analyze the actions of the one or more workflows and of the particular workflow, and based on analyzing the actions of the one or more workflows and of the particular workflow, select a primary workflow as a workflow to respond to the computer security threat. The system also includes an automated incident investigation engine that is configured to receive an alert that identifies the computer security threat, and process the computer security threat according to the primary workflow that is associated with the computer security threat and that identifies one or more actions to remediate the computer security threat.

The system may include one or more of the following optional features. The automated incident investigation engine may be further configured to receive an additional alert that identifies an unknown security threat, and process the unknown computer security threat according to one or more workflows that are associated with unknown security threats and that are selected from among the particular workflow, the one or more workflows, and additional workflows. Each workflow may include one or more execution paths that each are associated with a confidence score based on data from computing devices that are associated with the computer security threat.

The cognitive engine may be further configured to receive additional data identifying additional actions performed in response to the computer security threat, and update the one or more workflows and the particular workflow based on the additional data identifying the additional actions performed in response to the computer security threat.

The scoring system and event triage engine may be further configured to analyze the actions of the one or more workflows and of the particular workflow based on a threat confidence score calculated based on IP addresses, processes, and modified files that are associated with computing devices that are associated with the computer security threat.

The automated incident investigation engine may be further configured to process the computer security threat according to the particular workflow using log data that is associated with a computing device that is associated with the computer security threat and databases that include information related to IP addresses associated with the computing device and information related to processes associated with the computing device.

The system may also include an asset scoring engine that is configured to receive data identifying a computing device associated with the computer security threat, and determine a criticality score based on a user of the computing device and data stored on the computing device. The automated incident investigation engine may also be configured to process the computer security threat according to the particular workflow based on the criticality score satisfying a threshold.

Other implementations of this aspect include corresponding systems, apparatus, and computer programs recorded on computer storage devices, each configured to perform the operations described.

According to another innovative aspect of the subject matter described in this application, a method includes the processing steps of receiving data that identifies a computer security threat to a computing device and that includes log data associated with the computer security threat and with the computing device. Based on the computer security threat, identifying a workflow that identifies one or more actions to remediate the computer security threat. The method includes executing the workflow by determining a network threat confidence score based on IP addresses identified in the log data, determining a process threat confidence score based on processes identified in the log data, and determining a file threat confidence score based on modified files identified in the log data. The method further includes determining a threat confidence score based on the network threat confidence score, the process threat confidence score, and the file threat confidence score, and identifying additional processing to remediate the computer security threat based on the threat confidence score.

The method may include one or more of the following optional features. The threat confidence score may be a sum of the network threat confidence score, the process threat confidence score, and the file threat confidence score. The method may further include the step of determining a criticality score of the computing device based on an importance level of the computing device, wherein the threat confidence score is further based on the criticality score.

The step of determining a network threat confidence score based on IP addresses identified in the log data may include identifying IP addresses of connecting computing devices that connected to the computing device, identifying IP addresses of receiving computing devices to which the computing device connected, identifying internal IP addresses from among the IP addresses of connecting computing devices and the IP addresses of receiving computing devices, and determining the network threat confidence score based on the IP addresses identified in the log data other than the internal IP addresses. The step of determining a process threat confidence score based on processes identified in the log data may include identifying running processes from among the processes identified in the log data, and determining the process threat confidence score based on the running processes. The step of determining a file threat confidence score based on modified files identified in the log data may include identifying recently modified files that were modified within a previous period of time from among the modified filed identified in the log data, hashing the recently modified files, and determining the file threat confidence score based on the hashed recently modified files.

Other implementations of this aspect include corresponding systems, apparatus, and computer programs recorded on computer storage devices, each configured to perform the operations of the methods.

According to another innovative aspect of the subject matter described in this application, a method includes the processing steps of receiving data identifying two or more groups of actions performed to remediate a computer security threat, determining first unique paths from a first action of each of the two or more groups of actions to a second action of each of the two or more groups of actions, and determining second unique paths from the second action of each of the two or more groups of actions to a third action of each of the two or more groups of actions. The method also includes combining common paths among the first unique paths and the second unique paths, identifying one of the common paths that appears most frequently, and determining a core path that includes a subset of the actions of the two or more groups of actions based on the one of the common paths that appears most frequently.

The method may include one or more of the following optional features. The step of determining a core path may include identifying actions that appear before a first action of the one of the common paths, and including, before the first action of the one of the common paths, an action among the identified actions that appears most frequently before the first action of the one of the common paths. The method also may include determining an alternate path that includes actions of the two or more groups of actions other than the subset of the actions. Determining a core path may include identifying actions that appear after a last action of the one of the common paths, and including, after the last action of the one of the common paths, an action among the identified actions that appears most frequently.

The method may further include receiving additional data identifying an additional group of actions performed to remediate the computer security threat, and updating the core path based on the additional data. The method may further include providing the core path to an automated incident investigation engine for execution upon receipt of an alert that identifies the computer security threat.

Other implementations of this aspect include corresponding systems, apparatus, and computer programs recorded on computer storage devices, each configured to perform the operations of the methods.

Particular implementations of the subject matter described in this specification can be implemented so as to realize one or more of the following advantages. A system may be able to assess and respond to potential computer security threats more quickly which may improve the security of the devices and computers with a network or enterprise by identifying and addressing actual security threats sooner. Assessing and responding to potential computer security threats more quickly may also improve the performance of the system and/or the various computing engines within the system by ensuring that the system and/or computing engines use less computing resources to address false threats. The system may be able to learn and improve its threat response over time using machine learning techniques. The system may use the outcome of an assessment and response sequence to further train the system to improve the speed and accuracy of future assessment and response sequences, thus continuously improving the security and performance of the system.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 4A-4E illustrate an example process for identifying actions to respond to a computer security incident.

DETAILED DESCRIPTION

Figure 1:
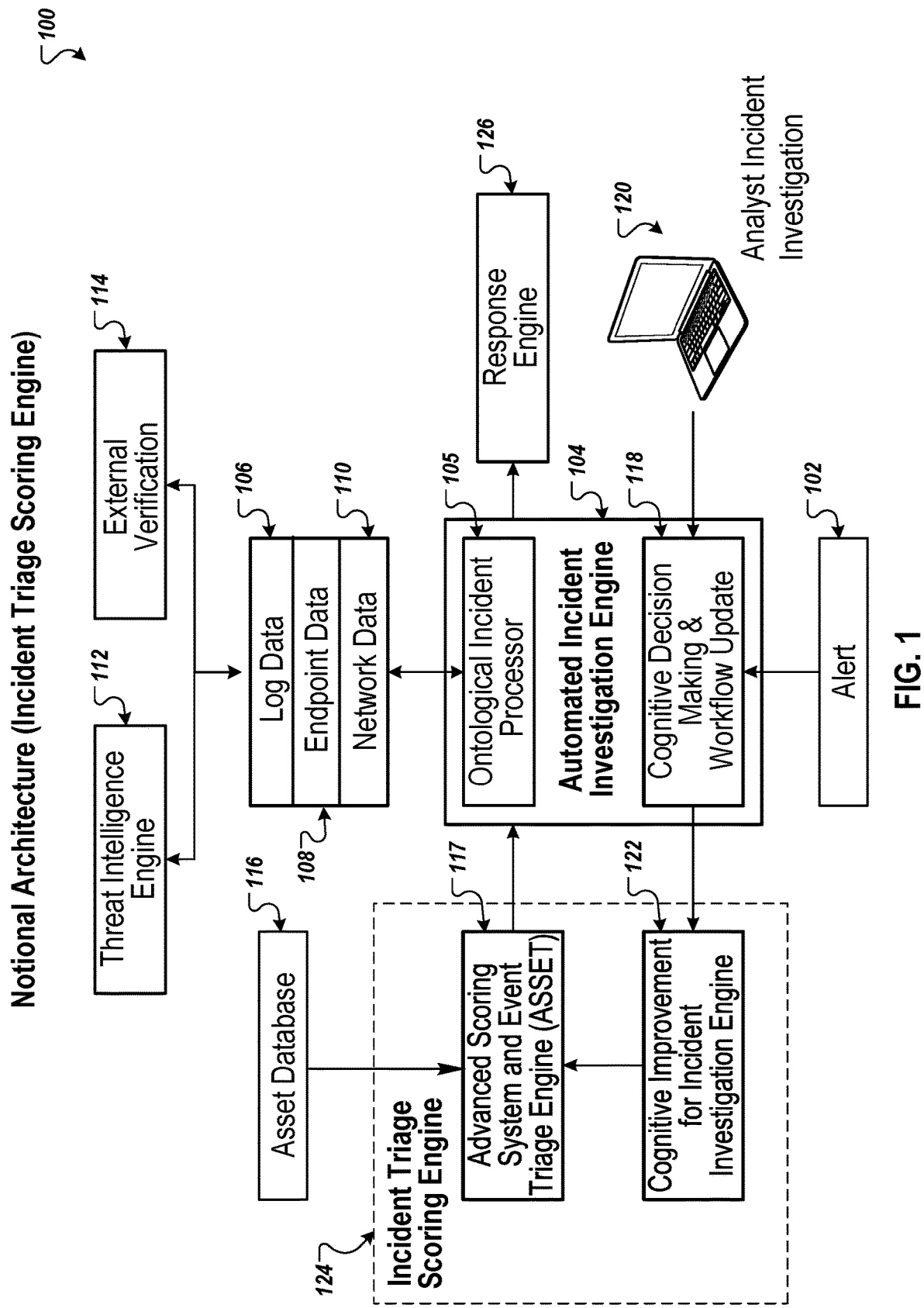
FIG. 1 illustrates an example system for computer security incident triage and response.

FIG. 1 illustrates an example system 100 for computer security incident triage and response. The system 100 includes an automated incident investigation engine 104 that in some implementations is responsible for executing an automated workflow through interaction with a response engine 126. The system also includes an incident triage scoring engine 124 that analyzes the actions of one or more workflows that are created to execute and respond to a computer security threat, and selects a primary workflow that is best suited to respond to the computer security threat. A particularly important feature of the incident triage scoring engine 124 is applying continuous machine learning processes when analyzing the paths of the various workflows, and then generating updates and changes to the processing steps and decisions within the workflows to improve their performance and outcome results for suppressing and containing the computer security threat. Briefly, in operation, and as described in more detail below, the system 100 receives a computer security alert 102 that indicates a computer security related threat or incident occurred on a computing device asset. The automated incident investigation engine 104 processes the computer security alert 102 according to an automated workflow selected by the incident triage scoring engine 124. Based on the outcome of the automated workflow, the automated incident investigation engine 104 instructs the response engine 126 to respond to the computer security alert 102 appropriately.

The system 100 provides an organized and automated approach to addressing and managing the computer security incidents. The system 100 is configured to reduce the impact and damage caused by the computer security threats or incidents, automate the repair and recovery of compromised assets, reduce the recovery time for the affected computing device or network, and to reduce the costs associated with remediating the computer security incidents. Additionally, the system 100 is configured to reduce the risk that a computer security incident will go undetected because the system 100 is configured to handle multiple incidents in parallel.

In the example shown in FIG. 1, the automated incident investigation engine 104 receives a computer security alert 102. A monitoring device, such as an intrusion detection system (IDS) or an intrusion prevention system (IPS), may generate the computer security alert 102 in response to detection of abnormal activity on a network of computing devices, such as an internal network of computers within a company or enterprise. The abnormal activity may also relate to activity on a particular computing device located on the network. The monitoring device may be a computing system that is configured to identify the abnormal activity and may be located within the network or have access to the network. The computer security alert 102 includes data identifying the affected network or computing device.

In some implementations, the monitoring device analyzes the incident and identifies a type of incident that the computer security alert 102 corresponds to. For example, the computer security alert 102 may be generated by the monitoring device as a result of malware, phishing, a trojan, spyware, pharming, a virus, etc. In instances where the monitoring device identifies the type of incident, the computer security alert 102 also includes data that specifically identifies the type of incident. In some implementations, the monitoring device does not analyze the incident or is unable to identify a type of incident that the computer security alert 102 corresponds to. In this instance, the computer security alert 102 includes data that indicates that the incident is an unknown type or does not include any data related to the type of incident.

The automated incident investigation engine 104 receives that computer security alert 102 and generates and assigns a threat confidence score. The threat confidence score reflects the potential of the incident to cause damage to the affected computing device or network. In some implementations, the threat confidence score may be a natural number where a high threat confidence score indicates an increased threat. In some implementations, the threat confidence score may be a probability where a greater probability indicates an increased threat.

The automated incident investigation engine 104 generates the threat confidence score by processing the computer security alert 102 according to a workflow. In some implementations, the ontological incident processor 105 executes a workflow. The workflow includes one or more investigative paths that each analyze a different aspect of the affected computing device or network. For example, an investigative path may analyze network features, such as IP addresses, processes, modified or newly created files, memory, registry, software, etc. By following each investigative path, the automated incident investigation engine 104 generates a corresponding confidence score for that path. In one exemplary implementation, the automated incident investigation engine 104 generates a network threat confidence score as a result of executing the network investigative path. In another exemplary implementation, the automated incident investigation engine 104 generates a memory threat confidence score as a result of executing the memory investigative path.

In some implementations, each workflow includes one or more primary investigative paths and one or more alternative investigative paths. The automated incident investigation engine 104, upon receiving an alert 102, executes the one or more primary investigative paths and calculates a score for each path. Based on either the score for one of the primary investigative path or the scores for more than one of the primary investigative paths, the automated incident investigation engine 104 may execute one or more of the alternative investigative paths. In one exemplary implementation, the automated incident investigation engine 104 may calculate a memory threat confidence score of eight out of ten. Based on the memory threat confidence score satisfying a threshold of seven by being greater than seven, the automated incident investigation engine 104 executes the (additional) alternative investigative path of analyzing modifying files.

In executing the different investigative paths of a workflow, the automated incident investigation engine 104 may access the logs 106. The logs 106 include details related to the network or computing device that is affected by the incident. The logs 106 may include endpoint data 108. Endpoint is another term for the computing device that is affected by the incident. The endpoint data 108 may include information related to the activity on the computing device itself, such as memory data, process data, file data including new and modified files, registry data, etc. The logs 106 may also include network data 110. The network data 110 includes network data that was received or transmitted from the endpoint. For example, data packets transmitted by the endpoint to a server and data packets transmitted from the server to the endpoint may be included in the network data 110.

The automated incident investigation engine 104 may also access a threat intelligence engine 112. The automated incident investigation engine 104 may access the threat intelligence engine 112 directly or through the log storage 106. The threat intelligence engine 112 is a database that stores data related to various threats and the changes that the various threats may cause to a system. The automated incident investigation engine 104 may provide log data related to the endpoint or the network or both and the threat intelligence engine 112 returns information based on whether the log data is reflective of a threat or not. The threat intelligence engine 112 may return a confidence score or a binary decision related to the threat. In some implementations, there are multiple threat intelligence engines for each type of log data. For example, there may be a threat intelligence engine for registry data, one for file data, etc. In this instance, the automated incident investigation engine 104 may provide the appropriate log data to each of the different threat intelligence engines and receive a confidence score or binary decision from each engine. In some implementations, the system 100 may update, using machine learning, the threat intelligence engine 112 once the system 100 has confidently identified the cause and effects of the incident.

The automated incident investigation engine 104 may also access an external verification engine 114. The automated incident investigation engine 104 may access the external verification engine 114 directly or through the log storage 106. The external verification engine 114 may provide similar functionality to the threat intelligence engine 112. The external verification engine 114 may be operated by a third party and provide a confidence score or a binary decision related to the threat upon the engine 114 receiving log data related to the endpoint or the network or both from the external verification engine 114. The third party may continuously update the external verification engine 114 based on data received from the system 100 as well as other threat detection and response systems.

The automated incident investigation engine 104 calculates threat confidence scores based on the data returned from the threat intelligence engine 112 and the external verification engine 114. In addition to these threat confidence scores, the system 100 also calculates a criticality score based on the importance of the endpoint. The importance of an endpoint may be representative of the particular user. For example, if the CEO of a company is the user of the endpoint device, then the criticality score may be greater than if the user of the endpoint device is an entry level analyst. The importance of an endpoint device may also be representative of the category of data stored or accessible by the endpoint. For example, a particular device that has access to a company's financial records or future product releases (i.e. a highly confidential category of data) may have a higher criticality score than an endpoint device that stores facility maintenance data. The asset database 116 may store this type of information such as particular users of devices as well as identifying the categories of data stored and accessible by different devices, so that this information can be readily accessed by the automated incident investigation engine 104. The automated incident investigation engine 104 may access the asset database 116 through the advance scoring system and triage (ASSET) engine 117 or directly.

To identify the appropriate paths for each of the workflows, the cognitive decision making and workflow update engine 118 processes data received from analyst investigations 120. The analyst investigations 120 includes data that are related to analyst actions taken in response to different types of security incidents. The analyst investigations 120 may include actions performed in response to a trojan attack, a malware attack, etc. The analyst investigations 120 may include actions such as querying different databases of the threat intelligence engine 112 and different external verification engines 114. For example, a particular analyst investigation 120 chosen from a set of multiple analyst investigations may include data describing that an analyst, in response to a phishing attack, analyzed the memory data of the affected endpoint, the processes running on the endpoint, and then the IP addresses related to the incident and the endpoint. Once the analyst performed those checks, the analyst then assigned a particular response for the response engine 126 to execute.

The cognitive decision making and workflow update engine 118 receives the analyst investigations 120 and identifies core paths and alternative paths based on an analysis of the actions taken by the analysts. The cognitive decision making and workflow update engine 118 provides the identified paths to the cognitive improvement for incident investigation engine 122. The incident investigation engine 122 is part of the incident triage scoring engine 124 which also includes the ASSET engine 117. The cognitive decision making and workflow update engine 118 may continuously receive the updated actions performed by analysts in response to various incidents. The cognitive decision making and workflow update engine 118 may provide those updates to the cognitive improvement for incident investigation engine 122 which will update the paths for each workflow to continuously update the core paths and the alternate paths.

In conjunction with the incident triage scoring engine 124, the cognitive improvement for incident investigation engine 122 may be configured to execute continuous machine learning processes when analyzing the paths of the workflows. In one implementation, the continuous machine learning processes may operate to update the workflows by modifying the paths (e.g. the core paths and the alternate paths) of the workflows to improve the performance of the workflows as the system iterates through the workflows to assess a computer security threat or incident. For example, the cognitive improvement for incident investigation engine 122 may implement updates and changes to the processing steps and decisions within the workflows, and then store the updated workflows. In addition, the updates and changes may be the result of a set of rules that are generated by the continuous machine learning processes. The advantage of iteratively changing and improving the workflows produces a higher confidence level that the workflow that is selected as the primary workflow will in fact fully assess the computer security threat or incident. The cognitive improvement for incident investigation engine 122 also may be configured to implement cognitive processing techniques. For example, the cognitive improvement for incident investigation engine 122 may ingest existing information in the form of updated actions performed by analysts and apply cognitive processing techniques to generate new action steps that can be used to update the workflows. The continuous machine learning processes and the cognitive processing techniques therefore assist the incident triage scoring engine 124 to reach an improved and acceptable confidence level that the workflow (e.g. the selected primary workflow) being executed is properly analyzing the security threat or incident.

The ASSET engine 117 receives the workflows and provides them to the automated incident investigation engine 104. The ASSET engine 117 also computes a criticality score for the affected endpoint and provides that criticality score to the automated incident investigation engine 104. In some implementations, the ASSET engine 117 may perform the scoring of the paths and identify paths for each workflow for each type of incident. The ASSET engine 117 may then provide data identifying the workflows and paths to the automated incident investigation engine 104. In some implementations, the ASSET engine 117 may compute confidence scores for each of the paths of a workflow and provides those scores to the automated incident investigation engine 104 where the automated incident investigation engine 104 calculates a total confidence score based on the criticality score and the confidence scores for each of the paths. The automated incident investigation engine 104 may then use the total confidence score to identify instructions for the response engine 126.

In some implementations, the incident triage scoring engine 124 and the automated incident investigation engine 104 may run on different servers. For example, the automated incident investigation engine 104 may run on one server that is configured to communicate with the logs 106, the threat intelligence engine 112, the external verification engine 114, incident triage scoring engine 124, the response engine 126, and the analyst investigations 120 and receive the alerts 102. The incident triage scoring engine 124 may run on another server that is configured to communicate with the asset database 116 and the automated incident investigation engine 104.

Figure 2:
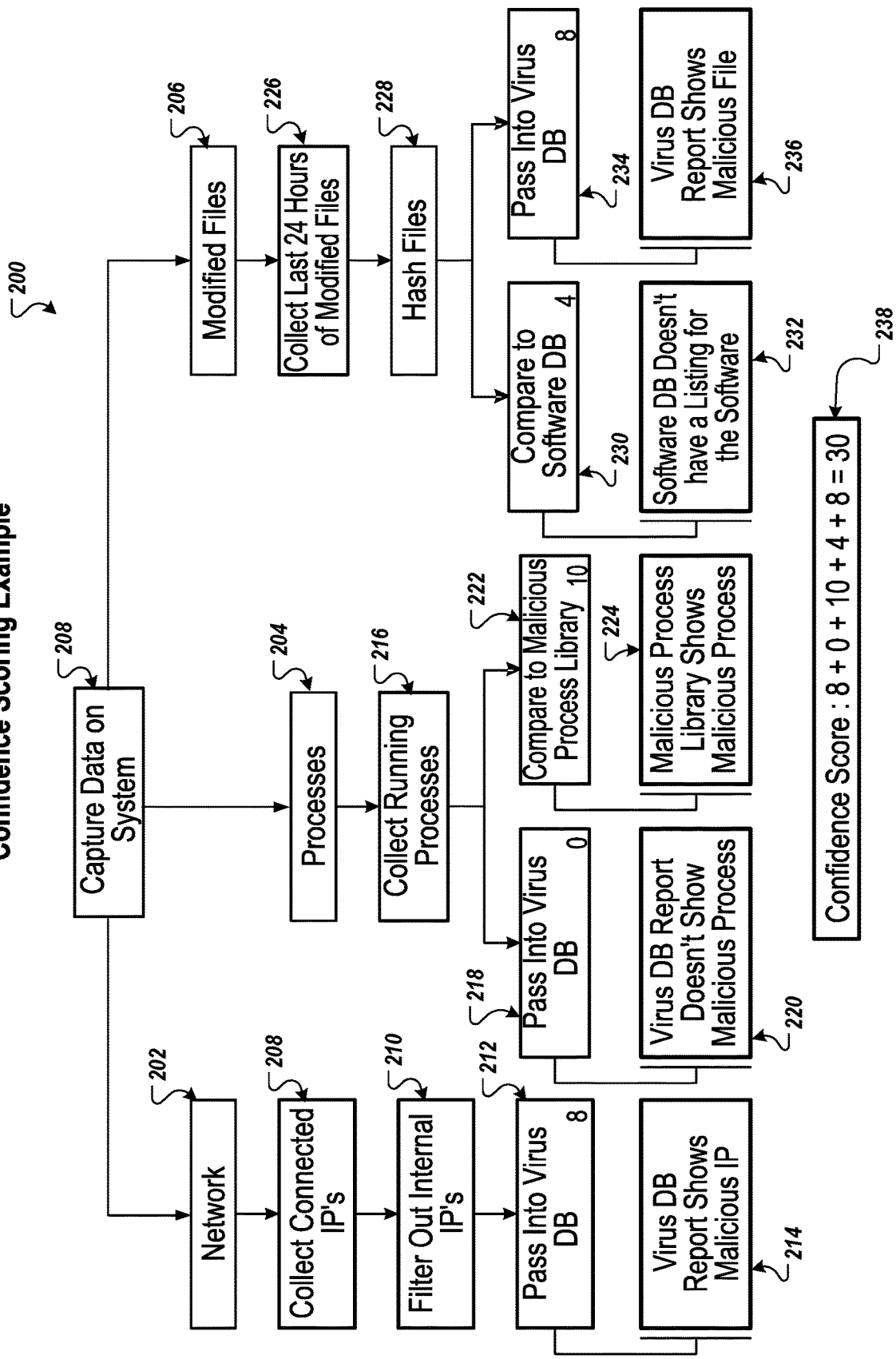
FIG. 2 illustrates an example workflow for scoring a computer security incident.

FIG. 2 illustrates an example incident analysis workflow 200 for scoring a computer security incident. Briefly, and as described in more detail below, the example workflow 200 illustrates three paths, the network analysis path 202, the process analysis path 204, and the modified file analysis path 206. The workflow 200 may be executed by the automated incident investigation engine 104 or the ASSET engine 117 of FIG. 1. The cognitive decision making and workflow update engine 118 and the cognitive improvement for incident investigation engine 122 may have generated the workflow.

The engine performing the workflow 200 may process the network path 202, the process path 204, and the modified file path 206 in a particular order as specified by the automated incident investigation engine 104 or the ASSET engine 117. In some implementations the engine may perform the paths in any particular order or in parallel. Before executing the network path 202, the process path 204, and the modified file path 206, the engine receives data 208 from the system. The data 208 may correspond to log data, for example, from log storage 106. In some implementations, the engine may request only data 208 needed to execute the paths of the specified workflow. For example, the engine may request network data for the network path 202, process data for the process path 204, and modified file data for the modified file path 206. In some implementations, the engine receives log data from the system and parses out the data required by each path in preparation for execution.

To execute the network analysis path 202, the engine analyzes the IP addresses that connected to the affected endpoint device (208). In some implementations, the engine also analyzes the IP address to which the endpoint device attempted to connect. The engine accesses a list of IP addresses that are located on the internal network that includes the endpoint device. Any of the internal IP addresses that attempted to access the affected device are filtered out of the list of IP addresses (210). Similarly, in some implementations, any internal IP addresses to which the affected device attempted to connect may also be filtered out. The engine passes the list of IP addresses to a virus database (212). The virus database returns a report that indicates whether the list of IP addresses includes any known malicious IP addresses (214). Based on the report, the engine assigns a network threat confidence score that indicates the confidence that the endpoint device has been compromised. In some implementations, the virus database may return a result indicating that the IP addresses are not on the malicious list. In this case, the results may be inconclusive and thus an average confidence score assigned. In this example, the virus databased indicated that a malicious IP address was included in the list of IP addresses. Accordingly, the engine assigned a confidence score of eight (8).

The engine is also operable to execute the process analysis path 204. The engine accesses a list of process being executed by the endpoint device (216). The process data may include memory usage, CPU usage, time that the processes has been executing, and any parent and child processes. The engine may query the log to request the data or the log may provide the data automatically in response to the alert. The engine provides process data to a virus database 218 and to a malicious process library 222. The virus database 218 and the malicious process library 222 each return different findings. The virus database 218 indicates that none of the processes running on the endpoint device are malicious (220). Accordingly, the engine assigns a confidence score of zero (0) to the results of the virus database 218. The malicious process library 222 indicates that at least one of the processes is malicious (224). Accordingly, the engine assigns a confidence score of ten (10) to the results of the malicious process library 222.

The engine executes the modified file analysis path 206. The engine accesses files modified by the endpoint device within a particular time period. In this example, the engine requests files modified within the last twenty-four hours (226). The engine computes a hash of each of the modified files (228). In some implementations, the modified files may also include metadata such as the path, the filename, the modification data and time, the file size, the owner, and other similar data. The engine may provide the hashed files and, optionally, any combination of metadata to a software database 232. The engine also provides the hashed files and, optionally, any combination of metadata to a virus database 234. In this exemplary implementation, the software database 230 does not return any data related to malicious software that may use any of the modified files or produce any of the modified files (232). Because of this uncertainty, the engine assigns a modified file threat confidence score of four (4). The virus database 234 returns data indicating that at least one of the modified files is a malicious file (236). With a malicious file identified, the engine assigns a modified file threat confidence score of eight (8).

In some implementations, each of the groups of data analyzed in each of the network path 202, the process path 204, and the modified file path 206 may analyze data that collected within a particular time range. For example, the time range may include the time when the system received the alert to the present time. The time range may also include a period of time before the system received the alert. For example, the period before the alert may be ten minutes. In some implementations, each path may use data from a different time range. For example, the process path 204 may analyze data from the time of the alert to the present time. The modified file path 206 may analyze data from the present time to five minutes before the alert.

In the example shown in FIG. 2, the engine computes a threat confidence score by summing each of the individual confidence scores for a threat confidence score of thirty (30). In some implementations, the engine may average each of the scores identified for each of the paths. Based on this score, the engine may perform further processing by analyzing the log data 106 according to different paths or provide instructions to the response engine 126.

Figure 3:
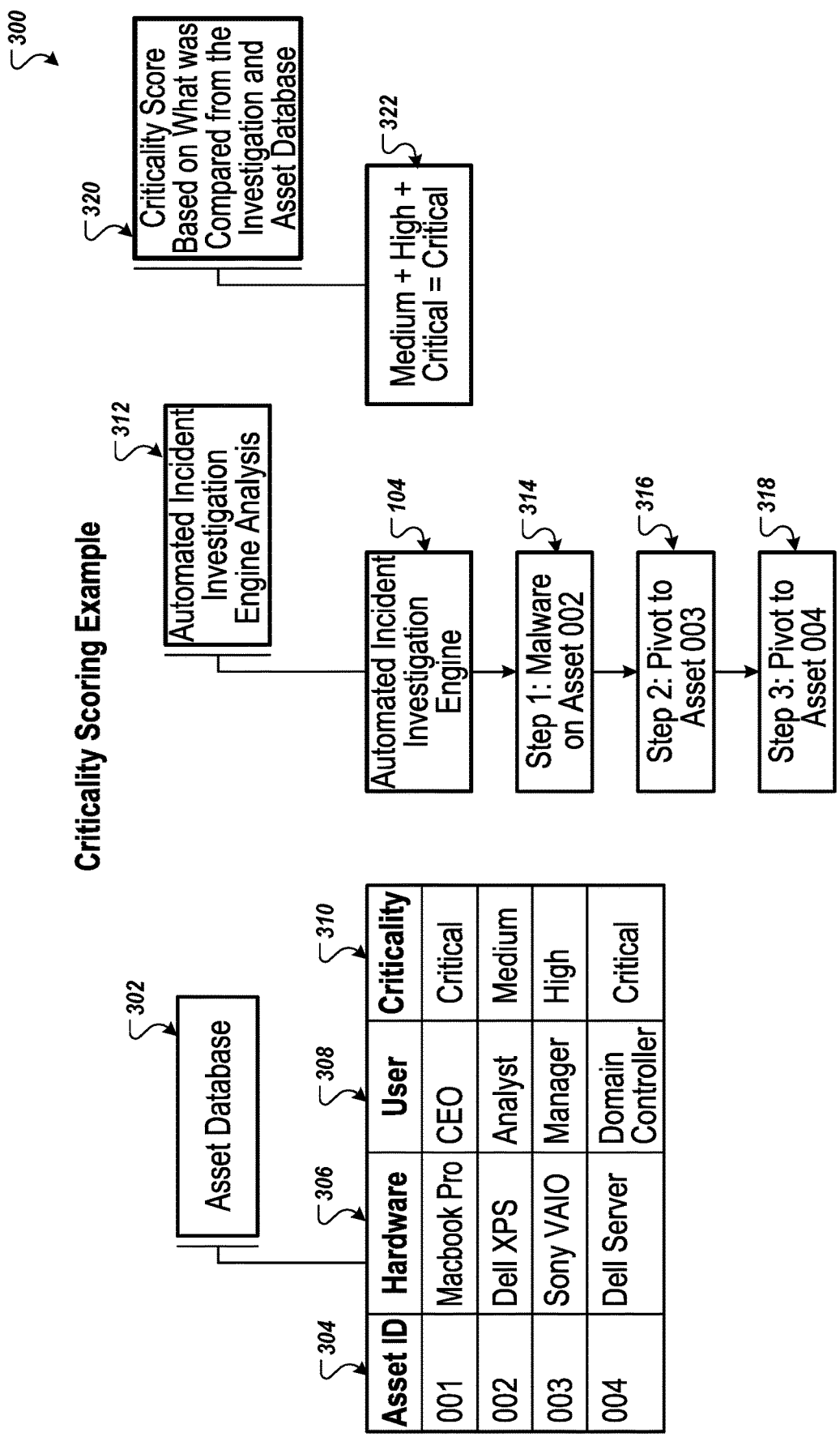
FIG. 3 illustrates an example workflow for scoring a criticality of an asset that experienced a computer security incident.

FIG. 3 illustrates an example workflow 300 for scoring a criticality of an asset that experienced a computer security incident. Briefly, and as described in more detail below, the example workflow 300 illustrates three factors used to determine a criticality score of an endpoint asset. The criticality is based on a relative importance of the endpoint asset based on factors such as the user, the data stored on the device, and the function of the device. The workflow 300 may be performed by an engine such as the ASSET engine 117 of FIG. 1.

The engine accesses the asset database 302 which may be similar to the asset database 116 of FIG. 1. The asset database 302 includes information related to each of the assets protected by the engine. For example, the asset database 302 includes an asset identifier 304 for each of the assets. The asset database 302 also includes the model of hardware 306 for each asset as well as the user 308 of the asset. The asset database also includes a criticality 310. As previously noted, the criticality 310 identifies a level of importance for the asset. The engine 302 or another system may apply the criticality labels based on a series of rules. For example, if the user is from a certain list of users, then the criticality level is assigned based on the user. The criticality may also be based on the data stored on the device, on the data accessible by the device, or on the devices accessible by the device.

The engine performs an analysis of the criticality of the assets affected by the incident (312). In some implementations, the engine receiving data form the asset database is the automated incident investigation engine 104. The engine receives data indicating that assets 002, 003, and 004 are affected by the incident. The engine accesses criticality data for asset 002, then for asset 003, and then for asset 004. In some implementations, the engine may access criticality information for each of the assets 002, 003, and 004 simultaneously.

The engine computes a criticality score based on the criticality data for each of the assets (320). In some implementations, the criticality is based on the asset with the highest criticality that is affected by the incident. In some implementations, the criticality is an average of the criticality of each asset. For example, criticality levels of low, medium, high, and critical may be assigned score of 10, 20, 30, and 40, respectively. The average of the criticality scores may be used to determine the overall criticality using similar ranges for the average. The engine determines the overall criticality 322 for the incident and provides the overall criticality 322 the automated incident investigation engine, such as the automated incident investigation engine 104 of FIG. 1.

FIGS. 4A-4E illustrate example processes 400a to 400e (respectively) for identifying actions to respond to a computer security threat or incident. Briefly, and as described in more detail below, processes 400a to 400e may be performed by an engine running one or more computing devices, for example, the cognitive decision making and workflow update engine 118 or the cognitive improvement for incident investigation engine 122 of FIG. 1. The engine analyzes actions taken by analysts in responding to a security incident and identifies at least one core path and maybe at least one alternative path for a workflow to respond to the security incident.

The processes 400a to 400e (FIGS. 4A-4E) illustrate a critical path analysis algorithm and record manual incident investigations by analysts and replicates them in automated workflows that can be used to update workflows in the automated investigation engine to provide new investigative paths and its associated scores. After each step of an investigation by an analyst is recorded, the engine determines which paths have been taken most often by the analysts. That path is added as an additional branch to the workflow that may be analyzed by the binary tree traversal model discussed below or added to the workflow executed by the automated incident response engine 104. The other paths taken are stored for later analysis. During an investigation workflow, if there is a certain threshold of recognized unknowns and the investigation was not resolved by the normal, or critical, paths then the engine returns to the alternate paths for further investigation.

In the example shown in processes 400a to 400e, the engine analyzes analyst actions taken in response to a malware 402a incident. Process 400a includes four paths taken by one or more analysts in response to malware 402a incident. Path 410a-412a includes an analysis of the memory data of the affected endpoint and then analysis of the processes running on the endpoint. Path 420a-424a includes an analysis of process data, network data, and then software data. Path 430a-434a includes an analysis of registry data, process data, and then network data. Path 440a-442a includes an analysis of memory data and then registry data. Each of the different paths ends at node 404a indicating that the analysis is complete. In the examples illustrated in processes 400a to 400e, the paths may correspond to workflows described above. For example, nodes 412a and 432a may be similar to path 204 of FIG. 2, and nodes 422a and 434a may be similar to path 202 of FIG. 2.

With reference to FIG. 4B, process 400b illustrates the first action of each path and the subsequent actions in analyzing malware 402b. Path 410b-412b moves from analysis of memory data 410b to analysis of process data 412b. Path 420b-422b moves from analyzing process data 420b to analyzing network data 422b. Path 430b-432b moves from analyzing registry data 430b to analyzing process data 432b. Path 440b-442b moves from analyzing memory data 440b to analyzing registry data 442b. Column 450b summarizes the first node of each path, and column 460b summarizes the second node of each path. Because each path has different nodes and a different order, column 470b summarizes that each node pair only appears once in the process 400b.

Figure 4A:
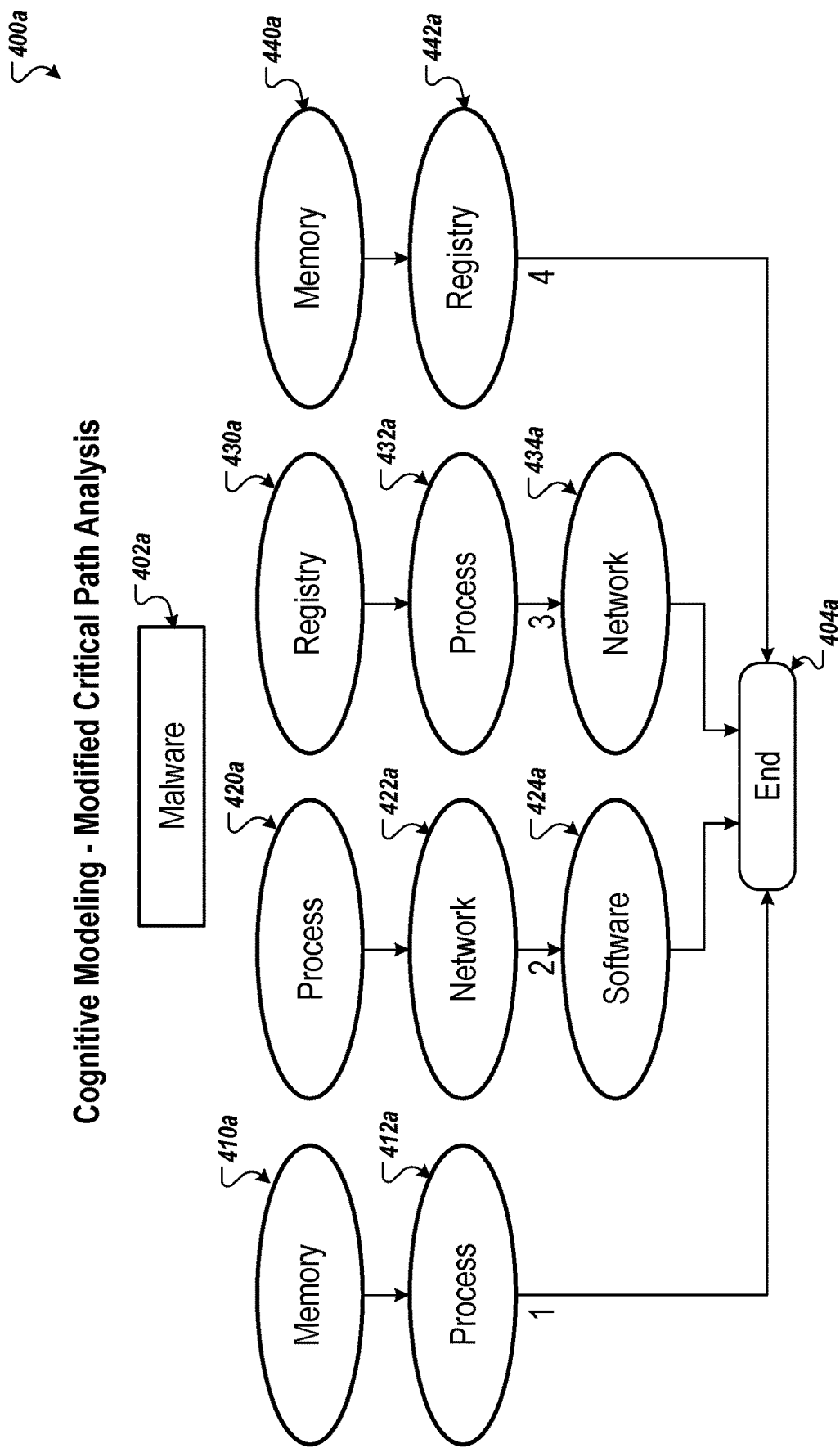
Figure 4C:
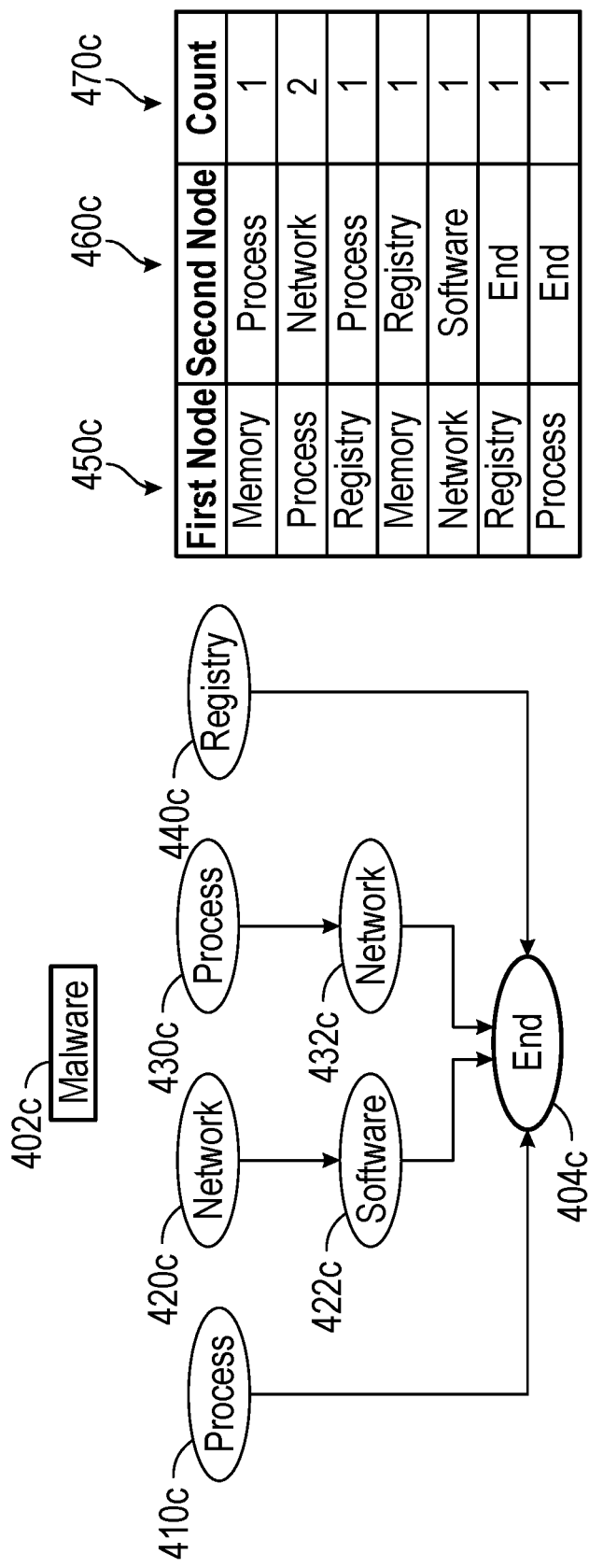

With reference to FIG. 4C, process 400c illustrates the second action of each path and the subsequent actions in analyzing malware 402c. Path 410c-404c moves from analyzing process data 410c to the end node 404c. Path 420c-422c moves from analyzing network data 420c to analyzing software data 422c. Path 430c-432c moves from analyzing process data 430c to analyzing network data 432c. Path 440c-404c moves from analyzing registry data 440c to the end node 404c. The engine adds the additional paths to the columns 450b, 460b, and 470b from FIG. 4B. Accordingly, each of the node pairs and node orders are unique with the exception of path 430c-432c which is the same as path 430b-432b. The process-network pair of columns 450c and 460c includes an entry of two in the count column 470c to reflect that this node pair has appeared twice in this example analysis.

Figure 4D:
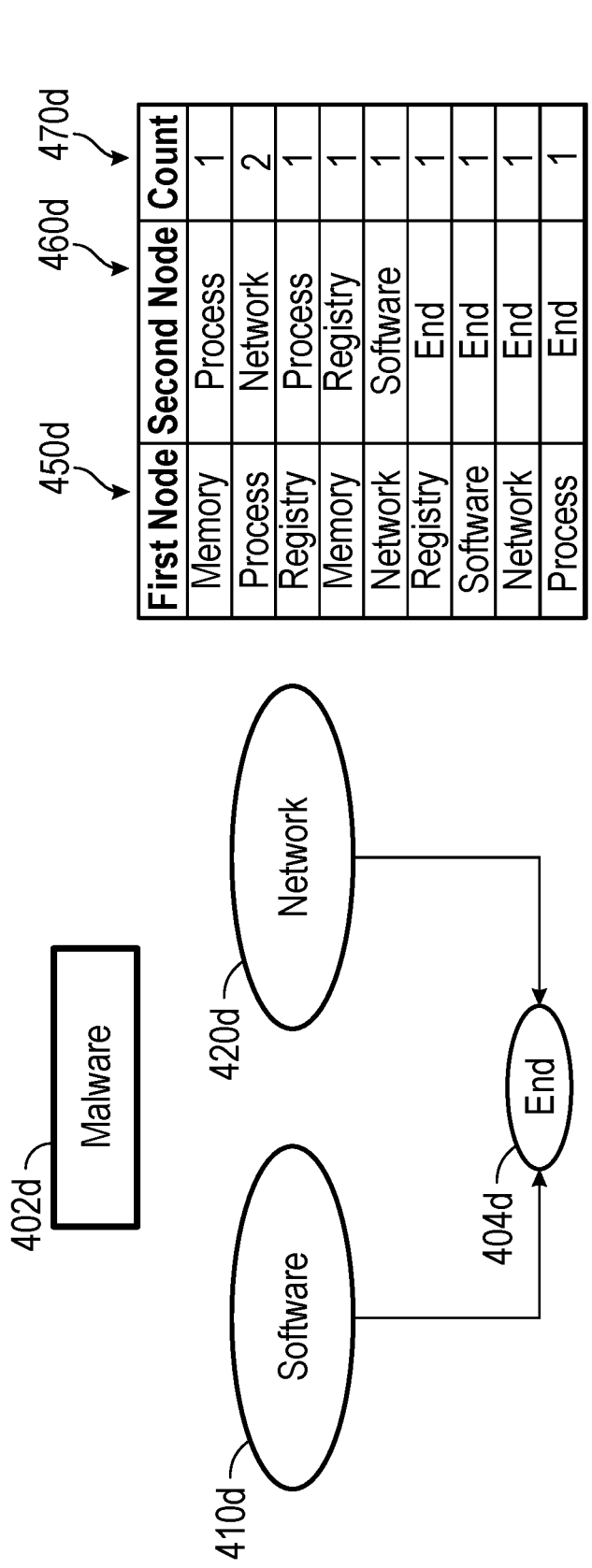

Similar to process 400c, process 400d shown in FIG. 4D illustrates the third actions for each path that includes a third action in the analysis of malware 402d. Path 410d-404d moves from analyzing software data 410d to the end node 404d. Path 420d-404d moves from analyzing network data 420d to the end node 404d. Both the software-end pair and the network-end pair are new. Columns 450d and 460d reflect these new pairs and counts of one are added to the column 470d.

Figure 4E:
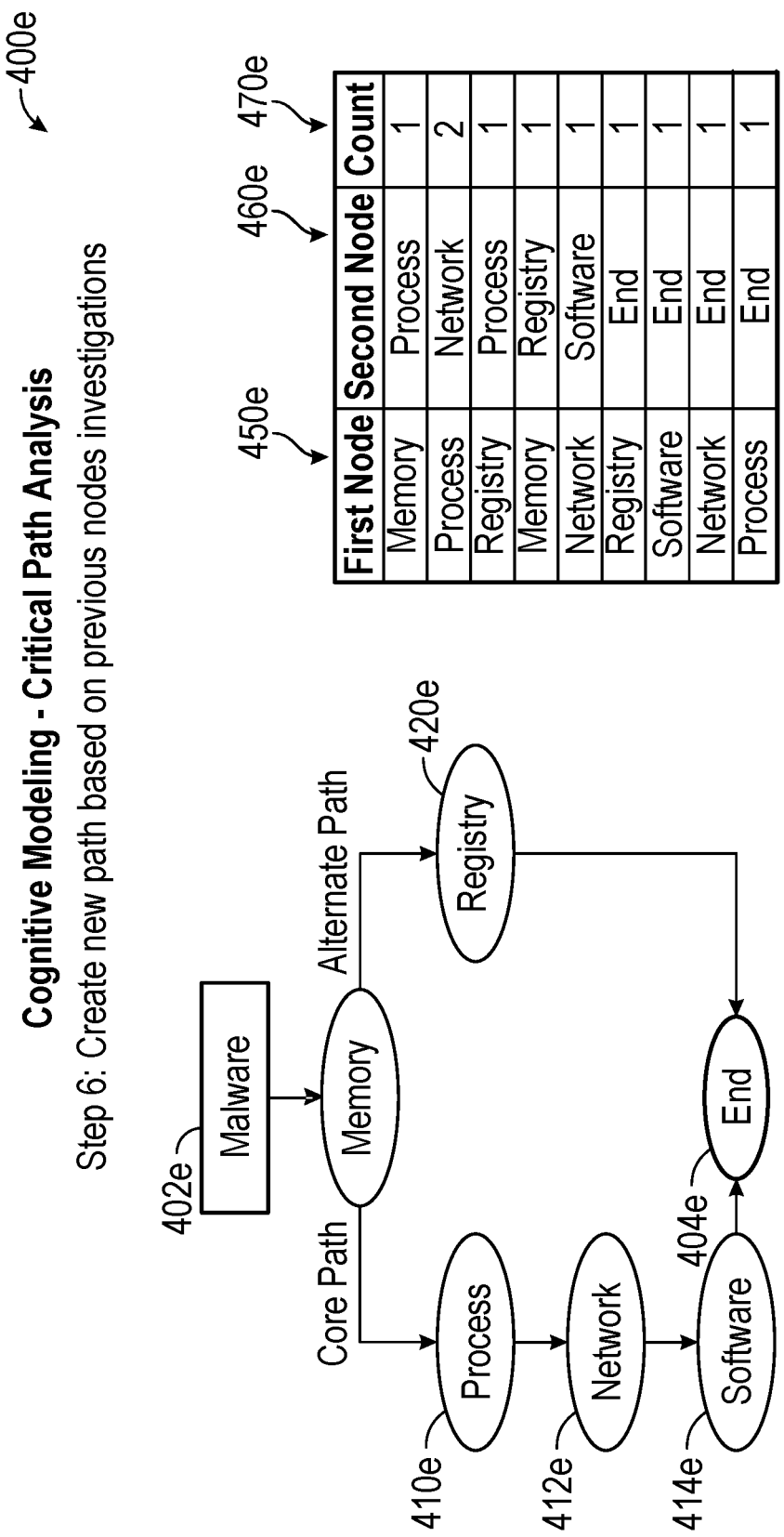

To generate the core path, the engine identifies the node pair that occurs most frequently among the node pairs of the different paths. Referring to FIG. 4E, in process 400e, the most common node pair in column 470e is analyzing processing data first as identified in column 450e and then analyzing network data as identified in column 460e. Therefore, the first actions in the core path 405e-404e is analyzing memory data 405e and then analyzing process data 410e. Returning to the columns 450e, 460e, and 470e, the most popular second node with analyzing process data in the column 450e is the process-network pair. Therefore, the next action in the core path 405e-410e-404e is analyzing network data 412e. Continuing that same process, the engine identifies analyzing software data 414e as an action to follow analyzing network data 412e. In columns 450e and 460e, the only node that follows analyzing software data is the end node 404e. In some implementations, the engine adds the remaining action to the core path 405e-410e-404e. For example, the engine adds analyzing memory 405e to the core path 405e-410e-404e because the columns 450e, 460e, and 470e include memory analysis before process analysis. Therefore, the core path 405e-410e-404e includes memory analysis 405e, process analysis 410e, network analysis 412e, software analysis 414e. This process continues to identify alternate paths. For example, alternate path 405e-420e-404e includes pairs from columns 450e, 460e, and 470e not identified in the core path 405e-410e-404e. The engine may also identify additional alternate paths not illustrated in process 400e. For example, the core path 405e-410e-404e and alternate path 405e-420e-404e do not include the registry-process pair or the process-end of columns 450e, 460e, and 470e. The registry-process pair and process-end pair may be added to create another alternate path of memory-registry-process-end. Additionally, the network-end pair is not used. Accordingly, a memory-process-network-end alternate path may also be added.

Once identified, the engine may provide the core path and the alternate paths to the automated incident response engine 104. The automated incident response engine 104 may then execute these paths upon receipt of a malware alert. The engine may identify additional paths for different types of incidents. Additionally, the engine may identify additional paths for unknown incidents based on the actions of analysts when encountering an unknown incident.

Figure 5:
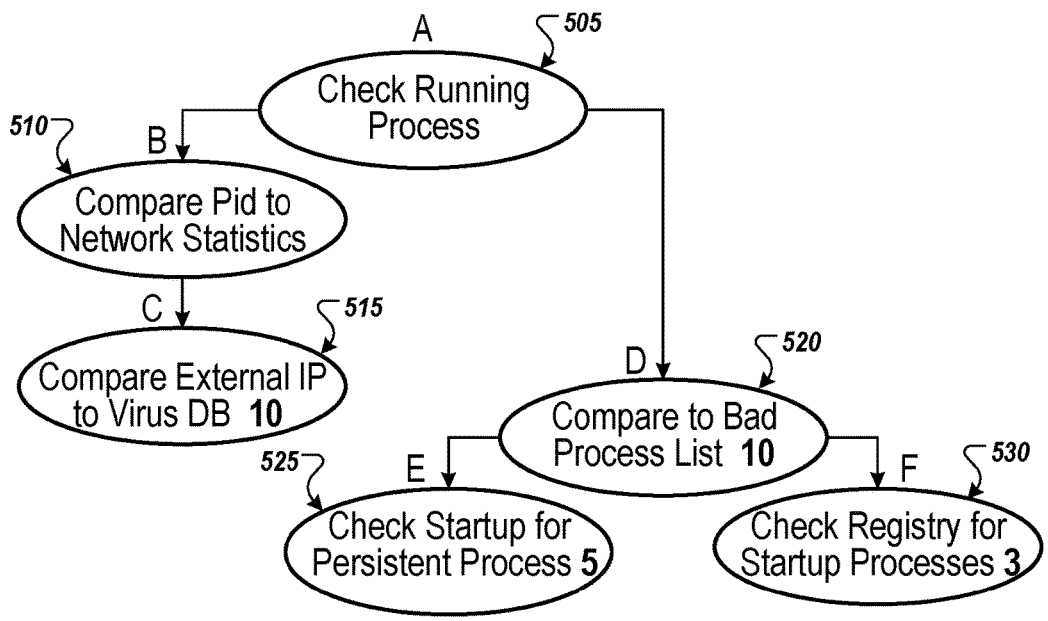
FIG. 5 illustrates an example binary tree for identifying actions to respond to a computer security incident.

FIG. 5 illustrates an example binary tree 500 for identifying actions to respond to a computer security threat or incident. Briefly, and as described in more detail below, the binary tree 500 includes the possible paths for incident investigations based on actions performed by analysts in response to an incident. By traversing the binary tree and calculating scores for each path, an engine identifies an efficient path for the incident. An engine may analyze the binary tree 500. The engine may be, for example, the cognitive decision making and workflow update engine 118 or the cognitive improvement for incident investigation engine 122 of FIG. 1. In some implementations, the engine analyzes an updated binary tree 500 each time an analyst performs a new investigative path.

The example binary tree 500 includes three paths. The first path A-B-C begins with checking running processes 505, then comparing process identifiers to network statistics 510, and then comparing external IP addresses to a virus database 515. The second path A-D-E begins with checking running processes 505, then comparing processes to a bad process list 520, and then checking startup for persistent processes 525. The third path A-D-F begins with checking running processes 505, then comparing processes to a bad process list 520, and then checking the registry for startup processes 530.

Prior to analyzing each of the paths of the binary tree, each node is assigned a score based how accurately the node reflects the risk to an organization upon receipt of an incident. Depending on the network structure and computing device distribution and setup, different organizations may provide varying levels of accuracy to assess risk upon performing a particular analysis. In the binary tree 500, comparing external IP addresses to a virus database 515 may be assigned a score of ten (10) because when an external IP address is associated with a virus in the virus database, there is a high probability that the incident is legitimate. For similar reasons, comparing processes to a bad process list 520 is assigned a score of ten (10). Because checking startup for persistent processes 525 does not correlate as well as nodes 515 or 520, node 525 is assigned a score of five (5). Checking the registry for startup processes 530 my correlate even less than nodes 515, 520, and 525. Therefore, node 530 is assigned a score of three (3). Finally, the nodes for checking running processes 505 and comparing process identifiers to network statistics 510 may not correlate at all and therefore are assigned a score of zero (0).

By traversing the binary tree 500, the engine can calculate a score for each of the paths. Path A-B-C has a score of ten (10). Path A-D-E has a score of fifteen (15). Path A-D-F has a score of thirteen (13). Because path A-D-E has the highest score, path A-D-E is the core path and paths A-B-C and A-D-F are the alternative paths. The engine provides the paths to the automated incident response engine 104 for analysis of incoming threats or incidents that correspond to the incident of the binary three 500. The engine may analyze additional binary trees that reflect actions taken in response to different types of threats or incidents. The core and alternative paths may also be provided to the automated incident response engine. The binary tree traversal process of FIG. 5 may be in addition to or an alternative to the path identification processes illustrated in FIGS. 4A-4E. For example, the automated incident response engine 104 may use the core path 405e-410e-404e or the core path A-D-E (505, 520, and 525) or both core paths.

Figure 6:
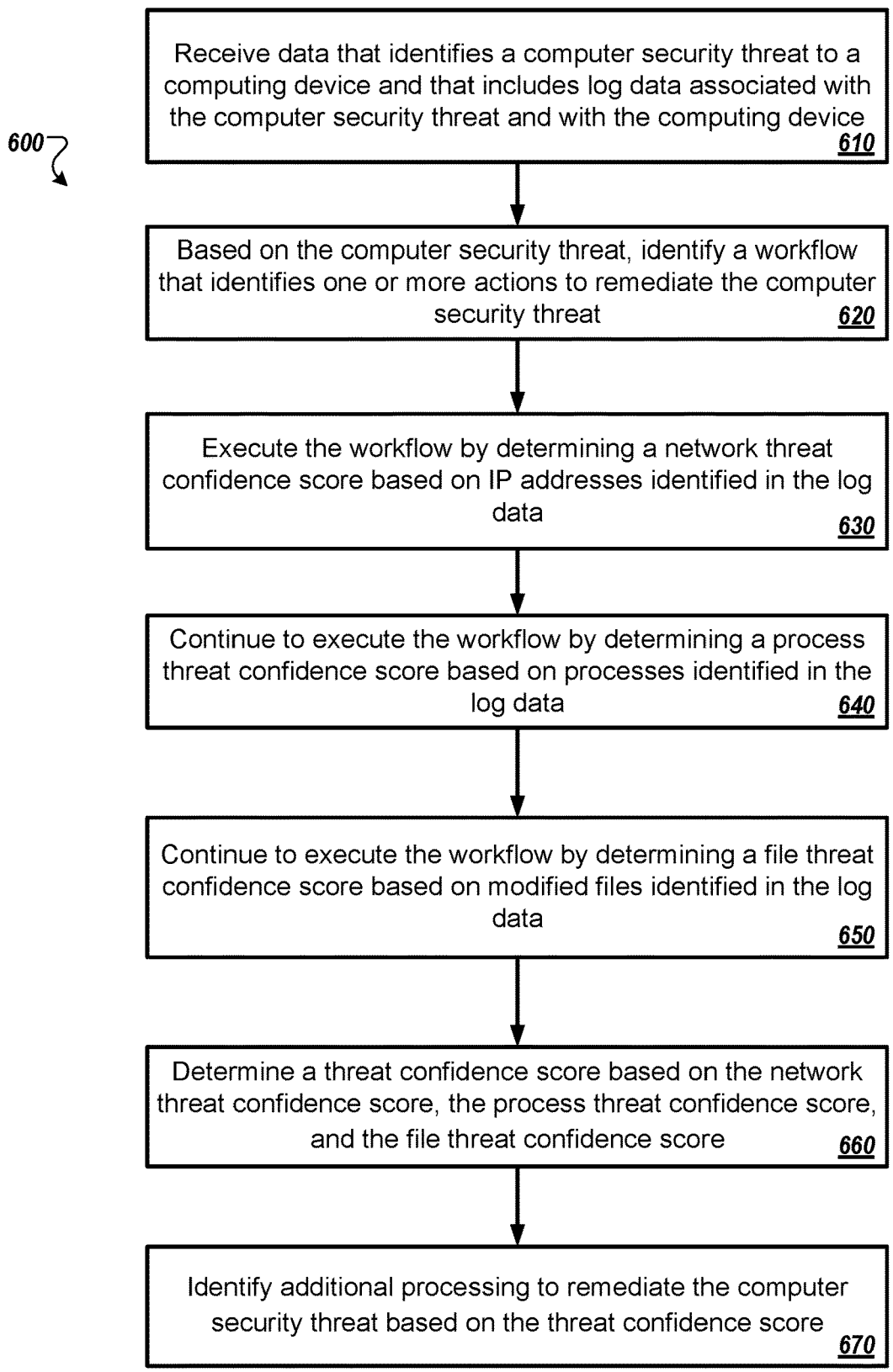
FIG. 6 illustrates an example flowchart for scoring a computer security incident.

FIG. 6 illustrates an example flowchart 600 for scoring a computer security threat or incident. In general, the process 600 calculates a confidence score that reflects a likelihood that a computer security threat or incident is malicious. The process 600 will be described as being performed by a computer system comprising one or more computers, for example, the system 100 as shown in FIG. 1.

The system receives data that identifies a computer security threat to a computing device and that includes log data associated with the computer security threat and with the computing device (610). The system, based on the computer security threat, identifies a workflow that identifies one or more actions to remediate the computer security threat (620).

The system executes the workflow by determining a network threat confidence score based on IP addresses identified in the log data (630). In some implementations, the system identifies IP addresses of connecting computing devices that connected to the computing device. The system further identifies, in some implementations, IP addresses of receiving computing devices to which the computing device connected. The system further identifies, in some implementations, internal IP addresses from among the IP addresses of connecting computing devices and the IP addresses of receiving computing devices. The system further determines, in some implementations, the network threat confidence score based on the IP addresses identified in the log data other than the internal IP addresses.

The system further executes the workflow by determining a process threat confidence score based on processes identified in the log data (640). In some implementations, the system identifies running processes from among the processes identified in the log data. The system further determines, in some implementations, the process threat confidence score based on the running processes.

The system further executes the workflow by determining a file threat confidence score based on modified files identified in the log data (650). In some implementations, the system identifies recently modified files that were modified within a previous period of time from among the modified filed identified in the log data. The system further hashes, in some implementations, the recently modified files. The system further determines, in some implementations, the file threat confidence score based on the hashed recently modified files.

The system determines a threat confidence score based on the network threat confidence score, the process threat confidence score, and the file threat confidence score (670). In some implementations, the threat confidence score is a sum of the network threat confidence score, the process threat confidence score, and the file threat confidence score. For example, the network threat confidence score is eight (8), the process threat confidence score is ten (10), and the file threat confidence score is two (2). The sum of the three scores, which is the network threat confidence score, is twenty (20). In some implementations, the threat confidence score is a probability based on an average of the network threat confidence score, the process threat confidence score, and the file threat confidence score. For example, the network threat confidence score is 0.4, the process threat confidence score is 0.9, and the file threat confidence score is 0.5. The average of the three scores, which is the network threat confidence score, is 0.6.

In some implementations, the system determines a criticality score of the computing device based on an importance level of the computing device. The threat confidence score is then further based on the criticality score. For example, the user of the computing device may be the CEO. In this instance, the criticality score may be ten out of ten. The system may then multiply the network threat confidence score by the criticality score or add the two scores to calculate a new network threat confidence score. The system identifies additional processing to remediate the computer security threat based on the threat confidence score (680). In some implementations, the additional processing may be an additional workflow. In some implementations, there may be no additional processing.

Figure 7:
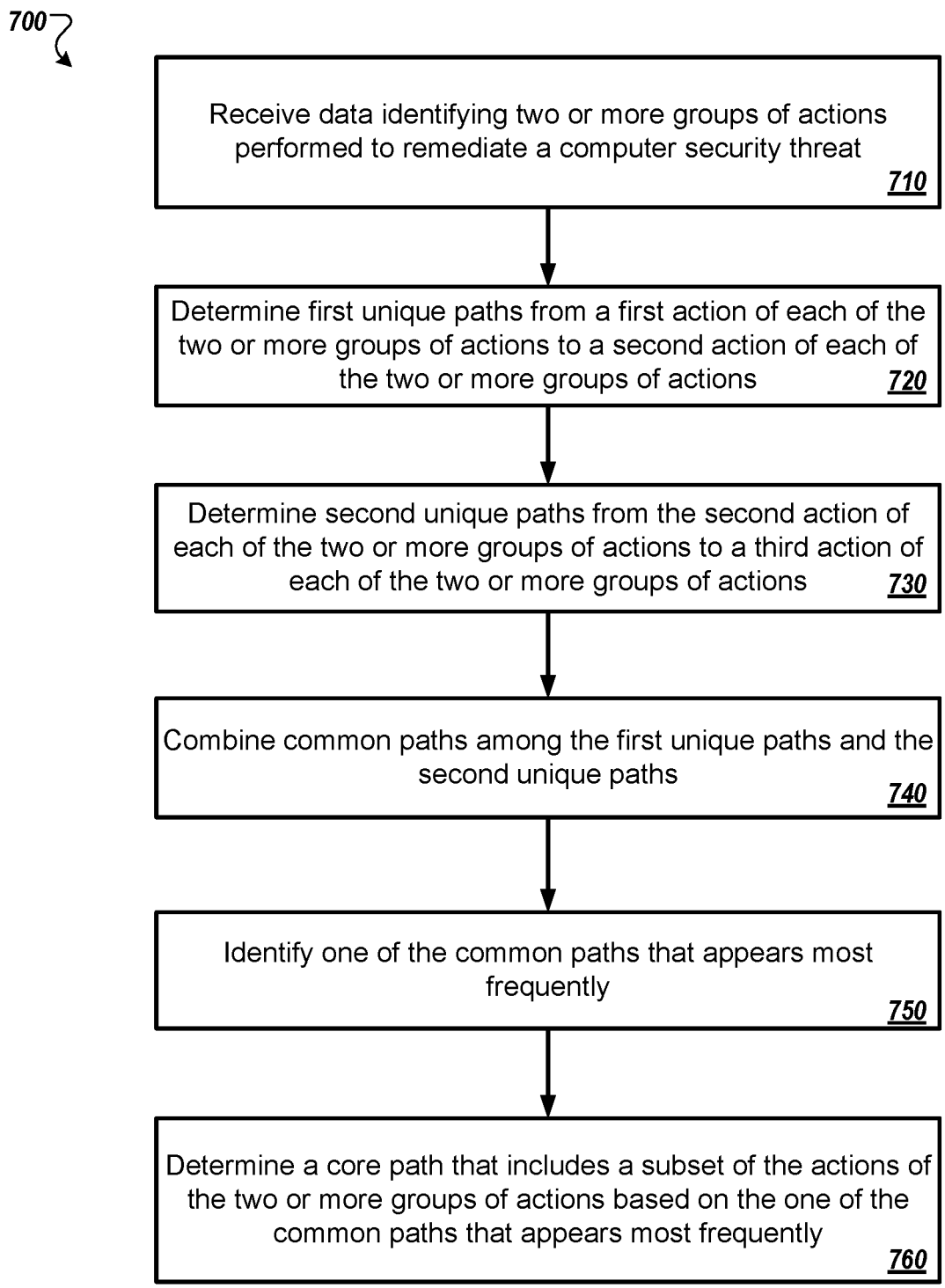
FIG. 7 illustrates an example flowchart for identifying actions to respond to a computer security incident.

FIG. 7 illustrates an example flowchart 700 for identifying actions to respond to a computer security threat or incident. In general, the process 700 calculates and identifies a workflow for a system to follow when responding to a particular type of computer security threat or incident. The process 700 will be described as being performed by a computer system comprising one or more computers, for example, the system 100 as shown in FIG. 1.

The system receives data identifying two or more groups of actions performed to remediate a computer security threat (710). For example, a first group of actions may include analyzing processes, analyzing registry details, and then analyzing network data. A second group of actions may include analyzing registry details, analyzing network data, and then analyzing memory data.

The system determines first unique paths from a first action of each of the two or more groups of actions to a second action of each of the two or more groups of actions (720). Continuing the example, the unique paths may include process-registry and registry-network. The system determines second unique paths from the second action of each of the two or more groups of actions to a third action of each of the two or more groups of actions (730). Continuing the example, the unique paths include registry-network and network-memory.

The system combines common paths among the first unique paths and the second unique paths (740). The system identifies one of the common paths that appears most frequently (750). In the example, the most common path is the registry-network path. The system determines a core path that includes a subset of the actions of the two or more groups of actions based on the one of the common paths that appears most frequently (760). In the example, the registry-network path becomes a core path of process-registry-network-memory when adding the actions of the other pairs.

In some implementations, the system determines an alternate path that includes actions of the two or more groups of actions other than the subset of the actions. In the above example, there may not be an alternative path. If there was a process-network pair, a registry-process path, or any other action pair that is not in the core path, the system may use that action pair as a basis for an alternative path.

In some implementations, the system identifies actions that appear before a first action of the one of the common paths. The system further includes, in some implementations and before the first action of the one of the common paths, an action among the identified actions that appears most frequently before the first action of the one of the common paths. As described in the above example, the system added process analysis to the beginning of the registry-network pair because process-registry is one of the action pairs.

In some implementations, the system identifies actions that appear after a last action of the one of the common paths. The system includes, in some implementations and after the last action of the one of the common paths, an action among the identified actions that appears most frequently. As described in the above example, the system added memory analysis to the end of the registry-network pair because network-memory is one of the action pairs.

In some implementations, the system receives additional data identifying an additional group of actions performed to remediate the computer security threat or incident. The system updates, in some implementations, the core path based on the additional data. For example, the system may receive data identifying an additional path or workflow performed by an analysis to remediate malware. The system may update the malware workflows and paths by adding the additional path or workflow to the group of paths and workflows used to identify core paths for malware. In some implementations, the system provides the core path to the automated incident investigation engine 104 for execution upon receipt of a security alert 102 that identifies the computer security threat or incident.

Figure 8:
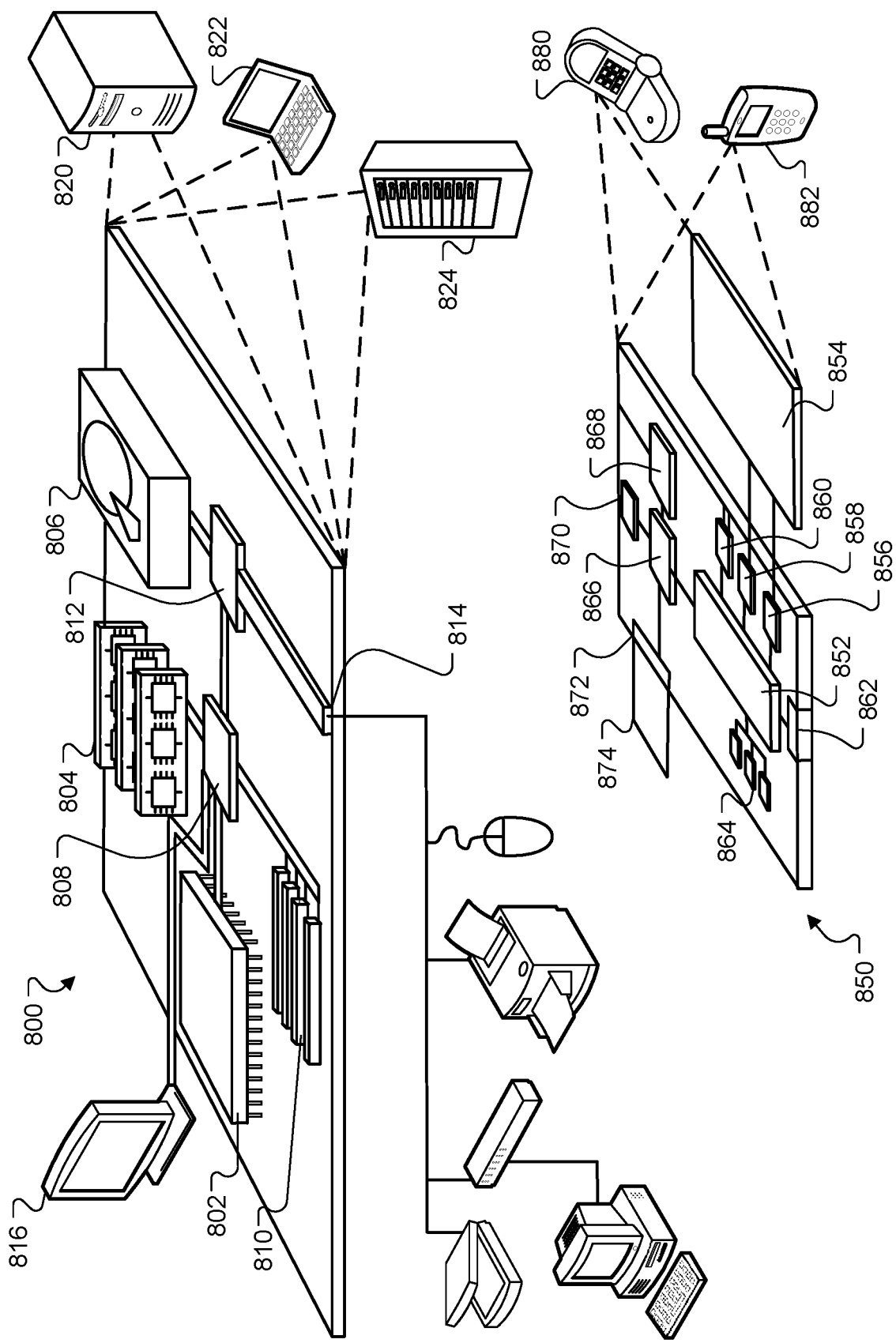
FIG. 8 illustrates an example of a computing device and a mobile computing device.

FIG. 8 shows an example of a computing device 800 and a mobile computing device 850 that can be used to implement the techniques described here. The computing device 800 is intended to represent various forms of digital computers, such as laptops, desktops, workstations, personal digital assistants, servers, blade servers, mainframes, and other appropriate computers. The mobile computing device 850 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 800 includes a processor 802, a memory 804, a storage device 806, a high-speed interface 808 connecting to the memory 804 and multiple high-speed expansion ports 810, and a low-speed interface 812 connecting to a low-speed expansion port 814 and the storage device 806. Each of the processor 802, the memory 804, the storage device 806, the high-speed interface 808, the high-speed expansion ports 810, and the low-speed interface 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as a display 816 coupled to the high-speed interface 808. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 804 stores information within the computing device 800. In some implementations, the memory 804 is a volatile memory unit or units. In some implementations, the memory 804 is a non-volatile memory unit or units. The memory 804 may also be another form of computer-readable medium, such as a magnetic or optical disk.

The storage device 806 is capable of providing mass storage for the computing device 800. In some implementations, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 802), perform one or more methods, such as those described above. The instructions can also be stored by one or more storage devices such as computer- or machine-readable mediums (for example, the memory 804, the storage device 806, or memory on the processor 802).

The high-speed interface 808 manages bandwidth-intensive operations for the computing device 800, while the low-speed interface 812 manages lower bandwidth-intensive operations. Such allocation of functions is an example only. In some implementations, the high-speed interface 808 is coupled to the memory 804, the display 816 (e.g., through a graphics processor or accelerator), and to the high-speed expansion ports 810, which may accept various expansion cards. In the implementation, the low-speed interface 812 is coupled to the storage device 806 and the low-speed expansion port 814. The low-speed expansion port 814, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. In addition, it may be implemented in a personal computer such as a laptop computer 822. It may also be implemented as part of a rack server system 824. Alternatively, components from the computing device 800 may be combined with other components in a mobile device, such as a mobile computing device 850. Each of such devices may contain one or more of the computing device 800 and the mobile computing device 850, and an entire system may be made up of multiple computing devices communicating with each other.

The mobile computing device 850 includes a processor 852, a memory 864, an input/output device such as a display 854, a communication interface 866, and a transceiver 868, among other components. The mobile computing device 850 may also be provided with a storage device, such as a micro-drive or other device, to provide additional storage. Each of the processor 852, the memory 864, the display 854, the communication interface 866, and the transceiver 868, are interconnected using various buses, and several of the components may be mounted on a common motherboard or in other manners as appropriate.

The processor 852 can execute instructions within the mobile computing device 850, including instructions stored in the memory 864. The processor 852 may be implemented as a chipset of chips that include separate and multiple analog and digital processors. The processor 852 may provide, for example, for coordination of the other components of the mobile computing device 850, such as control of user interfaces, applications run by the mobile computing device 850, and wireless communication by the mobile computing device 850.

The processor 852 may communicate with a user through a control interface 858 and a display interface 856 coupled to the display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may provide communication with the processor 852, so as to enable near area communication of the mobile computing device 850 with other devices. The external interface 862 may provide, for example, for wired communication in some implementations, or for wireless communication in other implementations, and multiple interfaces may also be used.

The memory 864 stores information within the mobile computing device 850. The memory 864 can be implemented as one or more of a computer-readable medium or media, a volatile memory unit or units, or a non-volatile memory unit or units. An expansion memory 874 may also be provided and connected to the mobile computing device 850 through an expansion interface 872, which may include, for example, a SIMM (Single In Line Memory Module) card interface. The expansion memory 874 may provide extra storage space for the mobile computing device 850, or may also store applications or other information for the mobile computing device 850. Specifically, the expansion memory 874 may include instructions to carry out or supplement the processes described above, and may include secure information also. Thus, for example, the expansion memory 874 may be provide as a security module for the mobile computing device 850, and may be programmed with instructions that permit secure use of the mobile computing device 850. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. The instructions, when executed by one or more processing devices (for example, processor 852), perform one or more methods, such as those described above. The instructions can also be stored by one or more storage devices, such as one or more computer- or machine-readable mediums (for example, the memory 864, the expansion memory 874, or memory on the processor 852). In some implementations, the instructions can be received in a propagated signal, for example, over the transceiver 868 or the external interface 862.

The mobile computing device 850 may communicate wirelessly through the communication interface 866, which may include digital signal processing circuitry where necessary. The communication interface 866 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 868 using a radio-frequency. In addition, short-range communication may occur, such as using a Bluetooth, WiFi, or other such transceiver. In addition, a GPS (Global Positioning System) receiver module 870 may provide additional navigation- and location-related wireless data to the mobile computing device 850, which may be used as appropriate by applications running on the mobile computing device 850.

The mobile computing device 850 may also communicate audibly using an audio codec 860, which may receive spoken information from a user and convert it to usable digital information. The audio codec 860 may likewise generate audible sound for a user, such as through a speaker, e.g., in a handset of the mobile computing device 850. Such sound may include sound from voice telephone calls, may include recorded sound (e.g., voice messages, music files, etc.) and may also include sound generated by applications operating on the mobile computing device 850.

The mobile computing device 850 may be implemented in a number of different forms, as shown in the figure. For example, it may be implemented as a cellular telephone 880. It may also be implemented as part of a smart-phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A system comprising:
 a cognitive engine that is configured to:
  receive data identifying actions performed in response to a computer security threat; and
  based on the data identifying the actions performed in response to the computer security threat, generate two or more workflows that are each associated with the computer security threat and that each identify one or more actions to remediate the computer security threat;
 a scoring system and event triage engine that is configured to:
  analyze the actions of the two or more workflows;
  based on analyzing the actions of the two or more workflows, generate a combined workflow by combining actions from at least two different workflows of the two or more workflows; and
  select the combined workflow as a primary workflow to respond to the computer security threat; and
 an automated incident investigation engine that is configured to:
  receive an alert that identifies the computer security threat; and
  process the computer security threat according to the primary workflow that is associated with the computer security threat and that identifies actions from at least two different workflows to remediate the computer security threat.

2. The system of claim 1, wherein the automated incident investigation engine is further configured to:
receive an additional alert that identifies an unknown security threat; and
process the unknown computer security threat according to one or more workflows that are associated with unknown security threats and that are selected from among the combined workflow, the two or more workflows, and additional workflows.

3. The system of claim 1, wherein each workflow includes one or more execution paths that each are associated with a confidence score based on data from computing devices that are associated with the computer security threat.

4. The system of claim 1, wherein the cognitive engine is further configured to:
receive additional data identifying additional actions performed in response to the computer security threat; and
update the two or more workflows and the combined workflow based on the additional data identifying the additional actions performed in response to the computer security threat.

5. The system of claim 1, wherein the scoring system and event triage engine is further configured to analyze the actions of the two or more workflows and of the combined workflow based on a threat confidence score calculated based on IP addresses, processes, and modified files that are associated with computing devices that are associated with the computer security threat.

6. The system of claim 1, wherein the automated incident investigation engine is further configured to process the computer security threat according to the combined workflow using log data that is associated with a computing device that is associated with the computer security threat and databases that include information related to IP addresses associated with the computing device and information related to processes associated with the computing device.

7. The system of claim 1, comprising:
an asset scoring engine that is configured to:
receive data identifying a computing device associated with the computer security threat; and
determine a criticality score based on a user of the computing device and data stored on the computing device,
wherein the automated incident investigation engine is further configured to process the computer security threat according to the combined workflow based on the criticality score satisfying a threshold.

8. A computer-implemented method comprising:
receiving data that identifies a computer security threat to a computing device and that includes log data associated with the computer security threat and with the computing device;
based on the computer security threat, identifying two or more workflows that each identify one or more actions to remediate the computer security threat;
generating a combined workflow by combining actions from at least two different workflows of the two or more workflows;
executing the combined workflow by:
determining a network threat confidence score based on IP addresses identified in the log data;
determining a process threat confidence score based on processes identified in the log data; and
determining a file threat confidence score based on modified files identified in the log data;
determining a threat confidence score based on the network threat confidence score, the process threat confidence score, and the file threat confidence score; and
identifying additional processing to remediate the computer security threat based on the threat confidence score.

9. The method of claim 8, wherein the threat confidence score is a sum of the network threat confidence score, the process threat confidence score, and the file threat confidence score.

10. The method of claim 8, comprising:
determining a criticality score of the computing device based on an importance level of the computing device,
wherein the threat confidence score is further based on the criticality score.

11. The method of claim 8, wherein determining a network threat confidence score based on IP addresses identified in the log data comprises:
identifying IP addresses of connecting computing devices that connected to the computing device;
identifying IP addresses of receiving computing devices to which the computing device connected;
identifying internal IP addresses from among the IP addresses of connecting computing devices and the IP addresses of receiving computing devices; and
determining the network threat confidence score based on the IP addresses identified in the log data other than the internal IP addresses.

12. The method of claim 8, wherein determining a process threat confidence score based on processes identified in the log data comprises:
identifying running processes from among the processes identified in the log data; and
determining the process threat confidence score based on the running processes.

13. The method of claim 8, wherein determining a file threat confidence score based on modified files identified in the log data comprises:
identifying recently modified files that were modified within a previous period of time from among the modified filed identified in the log data;
hashing the recently modified files; and
determining the file threat confidence score based on the hashed recently modified files.

14. A system, comprising:
one or more processors; and
a computer-readable storage device coupled to the one or more processors and having instructions stored thereon which, when executed by the one or more processors, cause the one or more processors to perform operations for responding to a computer security threat, the operations comprising:
receiving data that identifies a computer security threat to a computing device and that includes log data associated with the computer security threat and with the computing device;
based on the computer security threat, identifying two or more workflows that each identify one or more actions to remediate the computer security threat;
generating a combined workflow by combining actions from at least two different workflows of the two or more workflows;
executing the combined workflow by:
determining a network threat confidence score based on IP addresses identified in the log data;

determining a process threat confidence score based on processes identified in the log data; and determining a file threat confidence score based on modified files identified in the log data;

determining a threat confidence score based on the network threat confidence score, the process threat confidence score, and the file threat confidence score; and identifying additional processing to remediate the computer security threat based on the threat confidence score.

15. The system of claim 14, wherein the threat confidence score is a sum of the network threat confidence score, the process threat confidence score, and the file threat confidence score.

16. The system of claim 14, comprising:

determining a criticality score of the computing device based on an importance level of the computing device, wherein the threat confidence score is further based on the criticality score.

17. The system of claim 14, wherein determining a network threat confidence score based on IP addresses identified in the log data comprises:

identifying IP addresses of connecting computing devices that connected to the computing device;

identifying IP addresses of receiving computing devices to which the computing device connected;

identifying internal IP addresses from among the IP addresses of connecting computing devices and the IP addresses of receiving computing devices; and determining the network threat confidence score based on the IP addresses identified in the log data other than the internal IP addresses.

18. The system of claim 14, wherein determining a process threat confidence score based on processes identified in the log data comprises:

identifying running processes from among the processes identified in the log data; and determining the process threat confidence score based on the running processes.

19. The system of claim 14, wherein determining a file threat confidence score based on modified files identified in the log data comprises:

identifying recently modified files that were modified within a previous period of time from among the modified filed identified in the log data;

hashing the recently modified files; and determining the file threat confidence score based on the hashed recently modified files.

20. A non-transitory computer-readable storage medium coupled to one or more processors and having instructions stored thereon which, when executed by the one or more processors, cause the one or more processors to perform operations for responding to a computer security threat, the operations comprising:

receiving data that identifies a computer security threat to a computing device and that includes log data associated with the computer security threat and with the computing device;

based on the computer security threat, identifying two or more workflows that each identify one or more actions to remediate the computer security threat;

generating a combined workflow by combining actions from at least two different workflows of the two or more workflows;

executing the combined workflow by:

determining a network threat confidence score based on IP addresses identified in the log data;

determining a process threat confidence score based on processes identified in the log data; and determining a file threat confidence score based on modified files identified in the log data;

determining a threat confidence score based on the network threat confidence score, the process threat confidence score, and the file threat confidence score; and identifying additional processing to remediate the computer security threat based on the threat confidence score.

* * * * *